(12) United States Patent
Shi

(10) Patent No.: US 12,409,780 B2
(45) Date of Patent: Sep. 9, 2025

(54) REAR-VIEW MIRROR

(71) Applicant: SHENZHEN GUANGYI TECH CO., LTD., Shenzhen (CN)

(72) Inventor: Zhirui Shi, Shenzhen (CN)

(73) Assignee: SHENZHEN GUANGYI TECH CO., LTD., Shenzhen (CN)

( * ) Notice: Subject to any disclaimer, the term of this patent is extended or adjusted under 35 U.S.C. 154(b) by 630 days.

(21) Appl. No.: 17/784,698

(22) PCT Filed: Dec. 9, 2020

(86) PCT No.: PCT/CN2020/134745
§ 371 (c)(1),
(2) Date: Jun. 13, 2022

(87) PCT Pub. No.: WO2021/115294
PCT Pub. Date: Jun. 17, 2021

(65) Prior Publication Data
US 2023/0021346 A1    Jan. 26, 2023

(30) Foreign Application Priority Data
Dec. 13, 2019  (CN) .......................... 201911283125.9

(51) Int. Cl.
*G02F 1/155*  (2006.01)
*B60R 1/08*  (2006.01)
*G02F 1/161*  (2006.01)

(52) U.S. Cl.
CPC .............. *B60R 1/088* (2013.01); *G02F 1/155* (2013.01); *G02F 1/161* (2013.01)

(58) Field of Classification Search
CPC .......... B60R 1/088; G02F 1/155; G02F 1/161
See application file for complete search history.

(56) References Cited

U.S. PATENT DOCUMENTS

2004/0061920 A1  4/2004  Tonar et al.
2005/0270621 A1* 12/2005  Bauer .................... H05K 3/321
                                                      359/265
(Continued)

FOREIGN PATENT DOCUMENTS

CN      201607593 U    10/2010
CN      102862337 A     1/2013
(Continued)

OTHER PUBLICATIONS

CN 107380072 A (Feng, Yi et al.) machine translation (Year: 2017).*

(Continued)

*Primary Examiner* — James A Dudek
(74) *Attorney, Agent, or Firm* — Dickinson Wright PLLC

(57) ABSTRACT

A rear-view mirror includes an electrochromic film, a first glass layer, a second glass layer, a first transparent adhesive layer, a second transparent adhesive layer and a sealing structure layer. The first glass layer and the second glass layer are located on two faces of the electrochromic film respectively, the first transparent adhesive layer is located between the first glass layer and the electrochromic film, the second transparent adhesive layer is located between the second glass layer and the electrochromic film, the sealing structure layer is located on edges of the first glass layer and the second glass layer, the sealing structure layer, the first glass layer and the second glass layer form a sealing structure, and the electrochromic film is sealed in the sealing structure.

12 Claims, 2 Drawing Sheets

(56) References Cited

U.S. PATENT DOCUMENTS

| | | | |
|---|---|---|---|
| 2006/0158735 A1* | 7/2006 | Tonar | B60R 1/08 |
| | | | 359/507 |
| 2013/0107563 A1 | 5/2013 | McCabe et al. | |
| 2015/0103390 A1* | 4/2015 | Foote | G02F 1/155 |
| | | | 359/275 |
| 2018/0173035 A1* | 6/2018 | Port | E06B 9/24 |
| 2019/0204702 A1 | 7/2019 | Kloeppner et al. | |

FOREIGN PATENT DOCUMENTS

| | | |
|---|---|---|
| CN | 107380072 A | 11/2017 |
| CN | 207123692 U | 3/2018 |
| CN | 110901540 A | 3/2020 |
| IN | 211567810 U | 9/2020 |

OTHER PUBLICATIONS

CN 102862337 A (Chen, Bin et al.) machine translation (Year: 2013).*

International Search Report for PCT Application No. PCT/CN2020/134745, dated Mar. 3, 2021, 6 pages.

* cited by examiner

REAR-VIEW MIRROR

CROSS-REFERENCE TO RELATED APPLICATION(S)

This is a national stage application filed under 37 U.S.C. 371 based on International Patent Application No. PCT/CN2020/134745, filed Dec. 9, 2020, which claims priority to Chinese Patent Application No. 201911283125.9 filed with the China National Intellectual Property Administration (CNIPA) on Dec. 13, 2019, the disclosures of which are incorporated herein by reference in their entireties.

TECHNICAL FIELD

The present application belongs to the technical field of automobile parts, for example, a rear-view mirror.

BACKGROUND

Electronic automatic anti-dazzling rear-view mirrors are in an emerging stage. However, the core material of electrochromic technology is a liquid gel electrolyte, which makes the rear-view mirrors have low output and high prices. Only some high-end automobiles can be equipped with the rear-view mirrors. Rear-view mirrors using electrochromic films have been used by companies. The core materials of the rear-view mirrors have all-solid-state structures, which can effectively solve the problems of output and price.

However, since an automobile is in a state of continuous vibration during traveling, a rear-view mirror also vibrates. When used for a long period of time or when the automobile vibrates violently, the rear-view mirror using the electrochromic film is liable to fail. This is mainly due to the fact that the electrochromic film itself has a multilayer structure and is sandwiched between glass and a lens. The relative displacement between the glass and the lens during the vibration will cause the electrochromic film to twist, and even relative displacement occurs in the multilayer structure of the electrochromic film, resulting in that the electrochromic film cannot normally change color.

SUMMARY

The present application provides a rear-view mirror, which can effectively fix a thin-film device and enable the thin-film device to change color stably during use.

Provided is a rear-view mirror. The rear-view mirror includes an electrochromic film, a first glass layer, a second glass layer, a first transparent adhesive layer, a second transparent adhesive layer and a sealing structure layer. The first glass layer and the second glass layer are located on two faces of the electrochromic film respectively, the first transparent adhesive layer is located between the first glass layer and the electrochromic film, the second transparent adhesive layer is located between the second glass layer and the electrochromic film, and the sealing structure layer is located on edges of the first glass layer and the second glass layer, the sealing structure layer, the first glass layer and the second glass layer form a sealing structure, and the electrochromic film is sealed in the sealing structure.

Figure 1:
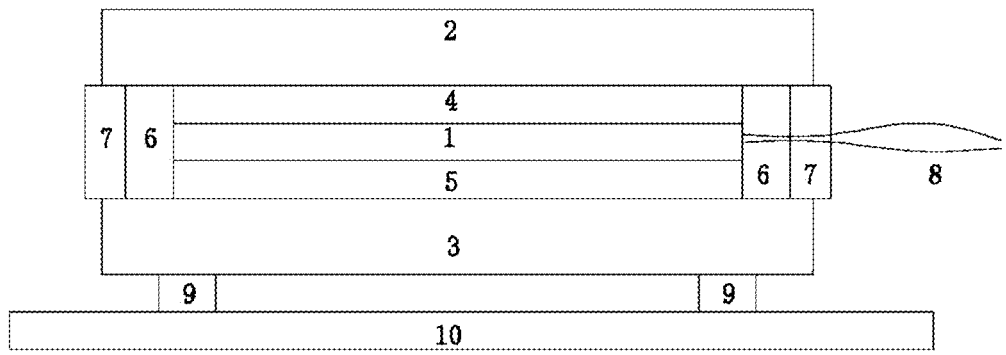
FIG. 1 is a structural diagram of a rear-view mirror according to an embodiment of the present application.

REFERENCE LIST 1 electrochromic film
2 first glass layer
3 second glass layer
4 first transparent adhesive layer
5 second transparent adhesive layer
6 sealing layer
7 structure layer
8 electrode
9 fixing strip
10 platform

DETAILED DESCRIPTION

To illustrate the present application and to facilitate the understanding of technical solutions in the present application, the present application is described below.

Embodiment One

In an embodiment of the present application, a rear-view mirror is provided. The rear-view mirror includes an electrochromic film, a first glass layer, a second glass layer, a first transparent adhesive layer, a second transparent adhesive layer and a sealing structure layer. The first glass layer and the second glass layer are located on two faces of the electrochromic film respectively, the first transparent adhesive layer is located between the first glass layer and the electrochromic film, the second transparent adhesive layer is located between the second glass layer and the electrochromic film, the sealing structure layer is located on edges of the first glass layer and the second glass layer, the sealing structure layer, the first glass layer and the second glass layer form a sealing structure, and the electrochromic film is sealed in the sealing structure.

The sealing structure layer seals the peripheral side of the electrochromic film, which greatly improves waterproof performance and can prevent the displacement between the first glass layer, the electrochromic film, and the second glass layer. A direction perpendicular to the first glass layer is regarded as a longitudinal direction and a direction parallel to the first glass layer is regarded as a transverse direction. The sealing structure layer, on the one hand, enhances the longitudinal adhesive force between the first glass layer and the second glass layer and on the other hand, greatly improves the transverse stability of the first glass layer, the electrochromic film, and the second glass layer, thereby providing a good shock absorption effect for the rear-view mirror and avoiding the relative displacement between multiple layers of the rear-view mirror.

The sealing structure layer includes a sealing layer and a structure layer which are disposed adjacent to each other, the sealing layer is disposed on a side facing the electrochromic film, and the structure layer is disposed on a side facing away from the electrochromic film. The sealing layer has good viscoelasticity, and can absorb forces generated by the vibration in the transverse direction and the longitudinal direction when the rear-view mirror vibrates, thereby producing a good shock absorption effect and preventing the relative displacement between the multiple layers of the rear-view mirror. The structure layer has good structural strength and relatively good aging and wear resistance, and the structure layer can improve the structural stability of the rear-view mirror.

The material of the sealing layer includes at least one of silicone adhesive, butyl rubber, or epoxy adhesive. The preceding materials each have a very low water vapor transmission rate. The sealing layer has two features: firstly, the sealing layer having a very low water vapor transmission rate which can ensure that the electrochromic film has excellent waterproof performance, and a excellent ability to block gases which prevents an internal device from failing because of oxidation; and secondly, the sealing layer has a good viscoelasticity which can absorb the forces generated by the vibration in the transverse direction and the longitudinal direction when the rear-view mirror vibrates, thereby producing the good shock absorption effect and preventing the relative displacement between the multiple layers of the rear-view mirror.

The material of the structure layer includes at least one of structural silicone adhesive or structural epoxy adhesive. The structure layer has the good structural strength, the good adhesive strength to glass, and the relatively good aging and wear resistance so that the structural stability and the service life of the rear-view mirror can be improved. In the present application, the values of the thickness of the sealing layer and the thickness of the structure layer are not limited, and in embodiments of the present application, the sealing layer and the structure layer each have a thickness of 0.5 mm to 1.8 mm. Based on the overall concept of the present application, the thickness of the sealing layer and the thickness of the structure layer may be adjusted according to requirements of products of the present application. Though the thickness of the sealing layer and the thickness of the structure layer are outside the preceding range, the thicknesses should be considered to fall within the scope of the present application.

The sealing layer is located on the peripheral side faces of the first transparent adhesive layer, the electrochromic film, and the second transparent adhesive layer. The sealing layer, the first transparent adhesive layer, and the second transparent adhesive layer form a sealed adhesive frame. When the rear-view mirror vibrates, the sealing layer can provide good fixing effects in the longitudinal direction and the transverse direction, thereby better fixing the electrochromic film and absorbing shocks for the electrochromic film. The outer structure layer enhances the stability of the structure.

The sealing layer is located between an edge of the first transparent adhesive layer and an edge of the second transparent adhesive layer, and is disposed on the peripheral side face of the electrochromic film. The sealing layer, the first transparent adhesive layer, and the second transparent adhesive layer form the sealed adhesive frame. When the rear-view mirror vibrates, the sealing layer can provide the good fixing effects in the longitudinal direction and the transverse direction, thereby better fixing the electrochromic film and absorbing the shocks for the electrochromic film. The outer structure layer enhances the stability of the structure.

The peripheral edges of the first transparent adhesive layer and the peripheral edge of the second transparent adhesive layer adhere to each other so that the electrochromic film is sealed between the first transparent adhesive layer and the second transparent adhesive layer. The sealing layer is located on the peripheral side faces of the first transparent adhesive layer and the second transparent adhesive layer. The first transparent adhesive layer and the second transparent adhesive layer seal the electrochromic film inside, greatly reducing the possibility of the misalignment between internal layers of the electrochromic film (such as an electrolyte layer, an ion storage layer, and a color-changing layer) when the rear-view mirror vibrates. Thus, the sealing layer provides the good fixing effects in the longitudinal direction and the transverse direction, thereby better fixing the electrochromic film and absorbing the shocks for the electrochromic film. The outer structure layer enhances the stability of the structure.

The thickness of the structure layer is not less than the thickness of the sealing layer and not greater than the sum of the thickness of the first glass layer, the thickness of the first transparent adhesive layer, the thickness of the electrochromic film, the thickness of the second transparent adhesive layer, and the thickness of the second glass layer.

The material of the first transparent adhesive layer includes at least one of optically clear adhesive (OCA), solid optically clear adhesive (SCA), ethylene-vinyl acetate (EVA) copolymer, or polyvinyl butyral (PVB); and the material of the second transparent adhesive layer includes at least one of the OCA, the SCA, the ethylene-vinyl acetate copolymer, or the polyvinyl butyral. The thickness of the first transparent adhesive layer and the thickness of the second transparent adhesive layer are not limited in the present application. For example, the first transparent adhesive layer and the second transparent adhesive layer each have a thickness of 0.1 mm to 0.8 mm. Sufficient stickiness between layers is ensured without causing a product to be excessively thick as a whole. Based on the overall concept of the present application, the thickness of the first transparent adhesive layer and the thickness of the second transparent adhesive layer may be adjusted according to the requirements of the products of the present application. Though the thicknesses are outside the preceding preferable range, the thicknesses should be considered to fall within the scope of the present application.

The face of the second glass layer facing the second transparent adhesive layer is coated with a reflective layer. The reflective layer may cause the second glass layer to be a specular reflector. The specular reflectance of the second glass layer is not limited in the present application. For example, the specular reflectance is 80% to 99.9%. Based on the overall concept of the present application, the specular reflectance of the second glass layer is adjusted according to the requirements of the products of the present application. Though the specular reflectance of the second glass layer is outside the preceding preferable range, the specular reflectance should be considered to fall within the scope of the present application.

The rear-view mirror further includes an electrode connected to the electrochromic film and led out from the sealing structure layer.

The rear-view mirror further includes fixing strips on the face of the second glass layer facing away from the electrochromic film, where the fixing strips are configured to fix the rear-view mirror on a platform, and the number of the fixing strips is not less than one. For example, one, two, three, or four fixing strips are used. The fixing strips can better fix the whole rear-view mirror, mitigate the influence of vibration on the whole mirror, and prevent the relative displacement of the whole mirror.

A fixing strip is a double-sided foam tape. Foam has a great final adhesive force, long-term durability, and temperature resistance, and can also be bonded to an irregular surface so that the surface flatness of the platform is not excessively required.

The rear-view mirror provided in the embodiment of the present application has the first transparent adhesive layer, the second transparent adhesive layer, and the sealing structure layer so that the electrochromic film is well fixed, and the relative vibration and distortion between the first glass layer, the electrochromic film, and the second glass layer, and the relative vibration and distortion between the multiple layers inside the electrochromic film are prevented. Thus, the electrochromic film changes color stably during use, will not be affected by the mechanical vibration of an automobile, and artificial external forces, mitigates the influence of the vibration on the rear-view mirror during the traveling of a vehicle, and has good waterproof performance. The fixing strips can better fix the whole rear-view mirror, mitigate the influence of the vibration on the whole mirror, and prevent the relative displacement of the whole mirror. The rear-view mirror provided in the embodiment of the present application can more effectively fix the electrochromic film, reduces the influence of the vibration on the electrochromic film during the traveling of the automobile, and has good shock absorption performance. Additionally, the rear-view mirror provided in the embodiment of the present application has the first transparent adhesive layer, the second transparent adhesive layer, and the sealing structure layer so that the resistance of the electrochromic film in the rear-view mirror to water and gases in the environment can be effectively improved, thereby having better waterproof performance.

Embodiment Two

In an embodiment of the present application, a method for preparing a rear-view mirror (applicable to the case where a first transparent adhesive layer and a second transparent adhesive layer are made of the ethylene-vinyl acetate copolymer or the polyvinyl butyral) is provided. The method includes steps described below.

1. A sealant is disposed around a first glass layer or a second glass layer. The first glass layer, the first transparent adhesive layer, an electrochromic film, the second transparent adhesive layer, and the second glass layer are stacked in this order and encapsulated so that a sealing structure is obtained.

2. A sealing structure layer is prepared on the sealing structure described in step 1 so that the rear-view mirror is obtained.

In the present application, to facilitate the preparation of the sealing structure layer, the sealant in step 1 does not completely cover edges of the glass layers, and part of the edges may be left to facilitate the preparation of the sealing structure layer in step 2.

The first glass layer and the second glass layer described in step 1 are cleaned and dried before use.

The sealant described in step 1 includes any one or a combination of at least two of the silicone adhesive, the butyl rubber, or the epoxy adhesive.

When the sealant is the butyl rubber, the butyl rubber is a butyl rubber strip. The height of the butyl rubber strip is 1.1 to 1.3 times as the total thickness of the first transparent adhesive layer, the electrochromic film, and the second transparent adhesive layer, for example, 1.1, 1.2, or 1.3 times.

The encapsulation described in step 1 is performed at a temperature of 120° C. to 140° C., for example, 120° C., 125° C., 130° C., 135° C., or 140° C.

The encapsulation described in step 1 is performed under a vacuum in which the vacuum degree is higher than 90 kPa.

The evacuation time of the encapsulation described in step 1 is 400 s to 600 s, for example, 400 s, 450 s, 500 s, 550 s, 600 s, or the like.

The lamination pressure of the encapsulation described in step 1 is 0.05 MPa to 0.1 MPa, for example, 0.05 MPa, 0.06 MPa, 0.07 MPa, 0.08 MPa, 0.09 MPa, 0.1 MPa, or the like.

In the present application, the lamination may be performed by a laminator.

The lamination time of the encapsulation described in step 1 is 400 s to 1200 s, for example, 400 s, 600 s, 800 s, 1000 s, 1200 s, or the like.

As a technical solution of the present application, an electrode is connected to the electrochromic film described in step 2.

As a technical solution of the present application, in step 2, the structure of the sealing structure layer is prepared as below: the structure formed after the encapsulation by the sealant described in step 1 is used as a sealing layer. A structural adhesive is dispensed and cured on edges of the first glass layer and the second glass layer to form the structure layer so that the rear-view mirror is obtained.

The sealing layer of the rear-view mirror obtained by the method is located on side faces of the first transparent adhesive layer, the electrochromic film, and the second transparent adhesive layer. The structure layer is disposed on the sealing layer. The advantages are simple steps, less equipment, and low requirements. When a sealant strip is disposed, leads will not be affected.

The preparation method further includes: fixing strips are attached to the face of the second glass layer of the rear-view mirror facing the second transparent adhesive layer, and the rear-view mirror is fixed on the platform with the fixing strips.

In an embodiment, the preparation method includes steps described below.

3. A circle of the sealant is disposed around the first glass layer or the second glass layer. The first glass layer, the first transparent adhesive layer, the electrochromic film, the second transparent adhesive layer, and the second glass layer are stacked in this order and encapsulated. The encapsulation is performed under the vacuum in which the vacuum degree is higher than 90 kPa and the lamination pressure of 0.05 MPa to 0.1 MPa so that the sealing structure is obtained.

The first glass layer and the second glass layer are cleaned and dried before use. The evacuation time of the encapsulation is 400 s to 600 s, and the lamination time of the encapsulation is 400 s to 1200 s.

2. The structure formed after the encapsulation by the sealant described in step 1 is used as the sealing layer. The structural adhesive is dispensed and cured on the edges of the first glass layer and the second glass layer to form the structure layer so that the rear-view mirror is obtained.

3. The fixing strips are attached to the face of the second glass layer of the rear-view mirror described in step 2 facing away from the electrochromic film, and the rear-view mirror is fixed on the platform with the fixing strips.

Embodiment Three

In an embodiment of the present application, a method for preparing a rear-view mirror (applicable to the case where a first transparent adhesive layer and a second transparent adhesive layer are made of the OCA or the SCA) is provided. The method includes steps described below.

4. The first transparent adhesive layer is prepared on the first glass layer, and the second transparent adhesive layer is prepared on the second glass layer so that a first glass layer with the first transparent adhesive layer and a second glass layer with the second transparent adhesive layer are obtained.

5. The first glass layer with the first transparent adhesive layer, and the second glass layer with the second transparent adhesive layer described in step 1, and the electrochromic film are bonded to prepare a sealing structure layer so that the rear-view mirror is obtained.

The first glass layer and the second glass layer described in step 1 are cleaned and dried before use. An electrode is connected to the electrochromic film described in step 2.

The method for bonding and preparing the sealing structure layer described in step 2 includes: a sealant strip is disposed on an edge of the first transparent adhesive layer described in step 1, and an edge of the second transparent adhesive layer described in step 1; the electrochromic film, the first glass layer with the first transparent adhesive layer, and the second glass layer with the second transparent adhesive layer are bonded; the bonded device is evacuated so that a sealing layer is formed; and structural adhesive is dispensed and cured on edges of the first glass layer and the second glass layer so that a structure layer is formed.

Alternatively, the method for bonding and preparing the sealing structure layer described in step 2 includes: the first glass layer with the first transparent adhesive layer and the second glass layer with the second transparent adhesive layer described in step 1 and the electrochromic film are bonded; the bonded device is evacuated; a sealant is dispensed and cured at positions around the first glass layer and the second glass layer facing the first transparent adhesive layer, the electrochromic film, and the second transparent adhesive layer so that a sealing layer is formed; and structural adhesive is dispensed and cured on the sealing layer so that a structure layer is formed. The sealing layer of the rear-view mirror obtained by the method is located on side faces of the first transparent adhesive layer, the electrochromic film, and the second transparent adhesive layer. The structure layer is disposed on the sealing layer. The advantages are simple steps, less equipment, and low requirements.

When used, sealant strips may be arranged in two layers, and the electrode is led out in the middle of the two layers. Therefore, the preceding sealant strips are used so that the total thickness of the two layers of the sealant strips is greater than the total thickness of the transparent adhesive layers and the electrochromic film before sealing. After lamination, the total thickness of the two layers of the sealant strips can be the same as the total thickness of the transparent adhesive layers and the electrochromic film so as to implement a better sealing function.

The evacuation is performed at a temperature of 115° C. to 125° C., for example, 115° C., 116° C., 117° C., 118° C., 119° C., 120° C., 121° C., 122° C., 123° C., 124° C., 125° C., or the like. At this temperature, not only bubbles in the area where adhesive is not bonded to the glass and the electrochromic film can be removed through the evacuation, but also the sealant can be melted. Thus, upper and lower layers of sealants are bonded so that the sealants can also implement a good sealing function at the electrode.

The preparation method further includes: fixing strips are attached to the face of the second glass layer of the rear-view mirror facing away from the electrochromic film, and the rear-view mirror is fixed on the platform with the fixing strips.

In an embodiment, the preparation method includes steps described below.

6. The first transparent adhesive layer is prepared on the cleaned and dried first glass layer, and the second transparent adhesive layer is prepared on the cleaned and dried second glass layer to obtain the first glass layer with the first transparent adhesive layer and the second glass layer with the second transparent adhesive layer.

The sealant strip is disposed on the edge of the first transparent adhesive layer described in step 1 and the edge of the second transparent adhesive layer described in step 1; the electrochromic film, the first glass layer with the first transparent adhesive layer, and the second glass layer with the second transparent adhesive layer are bonded; the bonded device is evacuated at the temperature of 115° C. to 125° C. so that the sealing layer is formed; and the structural adhesive is dispensed and cured on the edges of the first glass layer and the second glass layer so that the structure layer is formed and the rear-view mirror is obtained. Alternatively, the first glass layer with the first transparent adhesive layer and the second glass layer with the second transparent adhesive layer described in step 1 and the electrochromic film are bonded; the bonded device is evacuated at the temperature of 115° C. to 125° C.; the sealant is dispensed and cured at the positions around the first glass layer and the second glass layer facing the first transparent adhesive layer, the electrochromic film, and the second transparent adhesive layer so that the sealing layer is formed; and the structural adhesive is dispensed and cured on the sealing layer so that the structure layer is formed and the rear-view mirror is obtained.

3. The fixing strips are attached to the face of the second glass layer of the rear-view mirror described in step 2 facing away from the electrochromic film, and the rear-view mirror is fixed on the platform with the fixing strips.

Embodiment Four

A rear-view mirror is provided in this embodiment. As shown in FIG. 1 which is a structural diagram of the rear-view mirror, the rear-view mirror includes an electrochromic film 1, a first glass layer 2, a second glass layer 3, a first transparent adhesive layer 4, a second transparent adhesive layer 5 and a sealing structure layer. The first glass layer 2 and the second glass layer 3 are located on two faces of the electrochromic film 1 respectively, the first transparent adhesive layer 4 is located between the first glass layer 2 and the electrochromic film 1, the second transparent adhesive layer 5 is located between the second glass layer 3 and the electrochromic film 1, the sealing structure layer is located on edges of the first glass layer 2 and the second glass layer 3, the sealing structure layer, the first glass layer 2 and the second glass layer 3 form a sealing structure, and the electrochromic film 1 is sealed in the sealing structure. The sealing structure layer includes a sealing layer 6 and a structure layer 7. The sealing layer 6 is further connected to side faces of the first transparent adhesive layer 2, the electrochromic film 1, and the second transparent adhesive layer 3. The structure layer 7 is located on the side of the sealing layer 6 facing away from the electrochromic film 1. The electrochromic film 1 is further connected to an electrode 8 led out from the sealing structure layer. The rear-view mirror further includes two fixing strips 9 on the face of the second glass layer 3 facing away from the electrochromic film 1, where the fixing strips 9 fix the rear-view mirror on a platform 10.

In the rear-view mirror provided in this embodiment, both the first transparent adhesive layer 4 and the second transparent adhesive layer 5 are the polyvinyl butyral (PVB), the first transparent adhesive layer 4 has a thickness of 0.76 mm, and the second transparent adhesive layer 5 has a thickness of 0.76 mm. The second glass layer 3 has a face bonded to the second transparent adhesive layer 5, where the face is coated with a reflective layer, and the reflective layer adjusts the specular reflectance of the second glass layer 3 to 99.9%.

In the rear-view mirror provided in this embodiment, the sealing layer 6 is made of the butyl rubber and has a thickness of 1.8 mm. The structure layer 7 is made of the structural epoxy adhesive and has a thickness equal to or slightly greater than 1.8 mm. It suffices that the thickness of the structure layer 7 is not less than the thickness of the sealing layer 6 and not greater than the total thickness of the first glass layer 2, the first transparent adhesive layer 4, the electrochromic film 1, the second transparent adhesive layer 5, and the second glass layer 3.

In the rear-view mirror provided in this embodiment, fixing strips 9 are double-sided foam tapes and the number of fixing strips 9 is two.

In this embodiment, a method for preparing the preceding rear-view mirror is further provided. The method includes steps described below.

7. A first circle of a sealant strip is attached around the surface of a cleaned and dried first glass layer 2. The first glass layer 1, the first transparent adhesive layer 4, the electrochromic film 1, and the second transparent adhesive layer 5 are stacked in this order; after the electrode 8 is led out, a second circle of a sealant strip is stacked on the first circle of the sealant strip; and the second glass layer 3 is finally covered. In the laminator, evacuation is performed for 500 s to the vacuum degree of 100 kPa and lamination is performed at the lamination pressure of 0.08 MPa for 1000 s so that a sealing structure is obtained.

The sum of the heights of the first circle of the sealant strip and the second circle of the sealant strip is 1.2 times as the total thickness of the first transparent adhesive layer 4, the electrochromic film 1, and the second transparent adhesive layer 5. The thickness of the first circle of the sealant strip is 0.6 time as the total thickness of the first transparent adhesive layer 4, the electrochromic film 1, and the second transparent adhesive layer 5. The thickness of the second circle of the sealant strip is 0.6 time as the total thickness of the first transparent adhesive layer 4, the electrochromic film 1, and the second transparent adhesive layer 5.

2. The structure formed after the encapsulation by the sealant in step 1 is used as the sealing layer 6. The structural adhesive is dispensed and cured on edges of the first glass layer 2 and the second glass layer 3 to form the structure layer 7 so that the rear-view mirror is obtained.

3. The fixing strips 9 are attached to the face of the second glass layer 3 of the rear-view mirror described in step 2 facing away from the electrochromic film 1, and the rear-view mirror is fixed on the platform 10 with the fixing strips 9.

In the rear-view mirror provided in this embodiment, the electrochromic film 1 is well fixed, and the relative vibration and distortion are prevented. Thus, the electrochromic film changes the color stably during use, will not be affected by the mechanical vibration of the automobile, and the artificial external forces, mitigates the influence of the vibration on the rear-view mirror during the traveling of the vehicle, has the good waterproof performance and the excellent ability to block the gases, and prevents the internal device from failing because of the oxidation. The fixing strips better fix the whole rear-view mirror, mitigate the influence of the vibration on the whole mirror, and prevent the relative displacement of the whole mirror.

Embodiment Five

Figure 2:
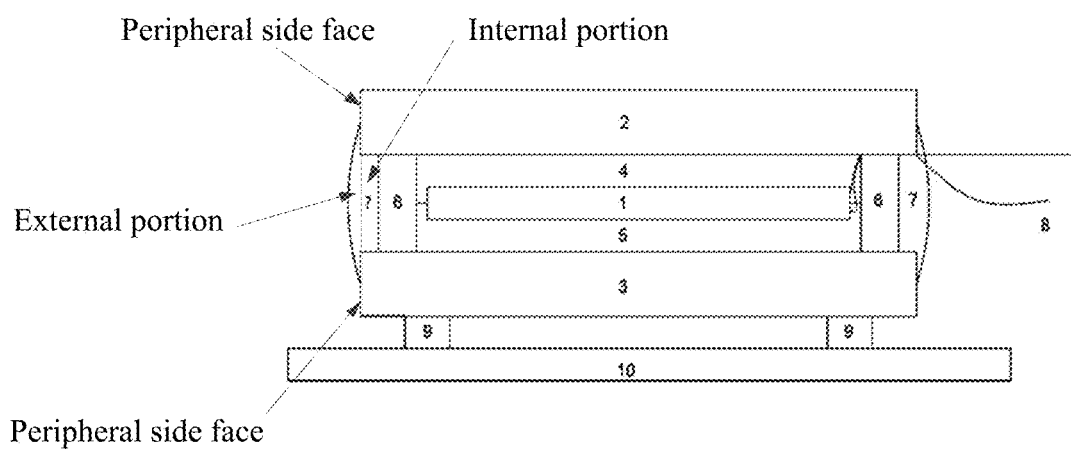
FIG. 2 is a structural diagram of another rear-view mirror according to an embodiment of the present application.

Referring to FIG. 2, the rear-view mirror provided in this embodiment is the same as the rear-view mirror in embodiment four except for features described below. The rear-view mirror in this embodiment differs from the rear-view mirror in embodiment four in that in the rear-view mirror provided in this embodiment, two sides of the electrochromic film 1 are narrower than the first transparent adhesive layer 4 and the second transparent adhesive layer 5, and the sides of the first transparent adhesive layer 4 and the second transparent adhesive layer 5 adhere to each other to enclose the electrochromic film 1 therein. Both the first transparent adhesive layer 4 and the second transparent adhesive layer 5 are films of ethylene-vinyl acetate (EVA) copolymers. The first transparent adhesive layer 4 has a thickness of 0.38 mm, and the second transparent adhesive layer 5 has a thickness of 0.38 mm. The second glass layer 3 has a face bonded to the second transparent adhesive layer 5, where the face is coated with a reflective layer, and the reflective layer adjusts the specular reflectance of the second glass layer 3 to 80%.

In the rear-view mirror provided in this embodiment, the sealing layer 6 is made of the silicone adhesive and has a thickness of 1.0 mm. The structure layer 7 is made of the structural epoxy adhesive and has a thickness of 1.0 mm.

In the rear-view mirror provided in this embodiment, a fixing strip 9 is the double-sided foam tape.

In this embodiment, a method for preparing the preceding rear-view mirror is further provided. The method includes steps described below.

8. A circle of the sealant strip is disposed around a cleaned and dried first glass layer 2. The first glass layer 2, the first transparent adhesive layer 4, an electrochromic film 1, the second transparent adhesive layer 5, and a cleaned and dried second glass layer 3 are stacked in this order. In the laminator, evacuation is performed for 400 s to the vacuum degree of 95 kPa and lamination is performed at the lamination pressure of 0.05 MPa for 1200 s so that a sealing structure is obtained.

The height of the preceding sealant strip is 1.2 times as the total thickness of the first transparent adhesive layer 4, the electrochromic film 1, and the second transparent adhesive layer 5.

2. The structure formed after the encapsulation by the sealant described in step 1 is used as the sealing layer 6. The structural adhesive is dispensed and cured on edges of the first glass layer 2 and the second glass layer 3 to form the structure layer 7 so that the rear-view mirror is obtained.

3. The fixing strips 9 are attached to the face of the second glass layer 3 of the rear-view mirror described in step 2 facing away from the electrochromic film 1, and the rear-view mirror is fixed on the platform 10 with the fixing strips 9.

In the rear-view mirror provided in this embodiment, the electrochromic film 1 is well fixed, and the relative vibration and distortion are prevented. Thus, the electrochromic film 1 changes the color stably during use, will not be affected by the mechanical vibration of the automobile, and the artificial external forces, mitigates the influence of the vibration on the rear-view mirror during the traveling of the vehicle, has the good waterproof performance and the excellent ability to block the gases, and prevents the internal device from failing because of the oxidation. The fixing strips better fix the whole rear-view mirror, mitigate the influence of the vibration on the whole mirror, and prevent the relative displacement of the whole mirror.

Embodiment Six

Figure 3:
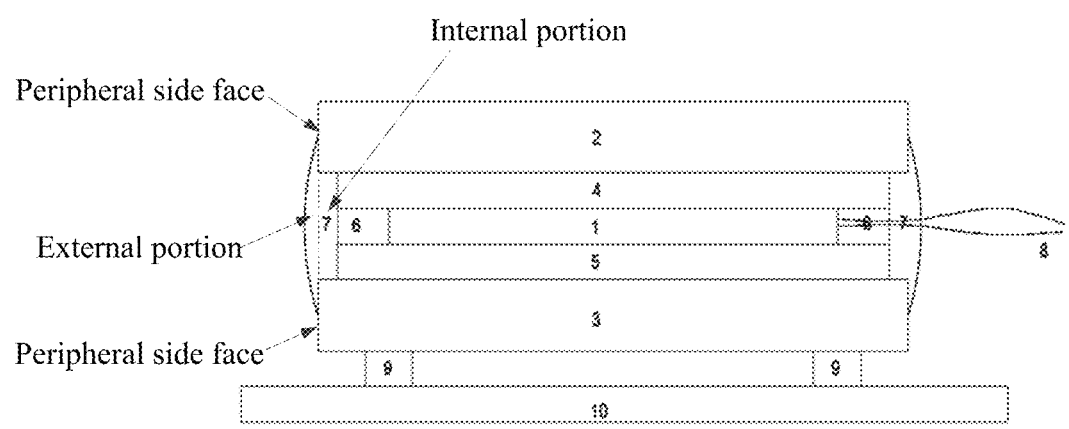
FIG. 3 is a structural diagram of another rear-view mirror according to an embodiment of the present application.

Referring to FIG. 3, the rear-view mirror provided in this embodiment is the same as the rear-view mirror in embodiment four except for features described below. The rear-view mirror in this embodiment differs from the rear-view mirror in embodiment four in that two sides of the electrochromic film 1 are narrower than the first transparent adhesive layer 4 and the second transparent adhesive layer 5, and the sealing layer 6 is located between the first transparent adhesive layer 4 and the second transparent adhesive layer 5 to seal sides of the electrochromic film 1. The first transparent adhesive layer 4 is the OCA and has a thickness of 0.1 mm. The second transparent adhesive layer 5 is the OCA and has a thickness of 0.1 mm. The second glass layer 3 has a face bonded to the second transparent adhesive layer 5, where the face is coated with a reflective layer, and the reflective layer adjusts the specular reflectance of the second glass layer 3 to 90%. The sealing layer 6 is made of the butyl rubber and has a thickness of 0.5 mm. The structure layer 7 is made of the structural silicone adhesive and has a thickness of 0.5 mm.

In this embodiment, a method for preparing the preceding rear-view mirror is further provided. The method includes steps described below.

9. The first transparent adhesive layer 4 is attached to a cleaned and dried first glass layer 2 through a positioning fixture, and the second transparent adhesive layer 5 is attached to a cleaned and dried second glass layer 3 through the positioning fixture to obtain a first glass layer 1 with the first transparent adhesive layer 4 and a second glass layer 3 with the second transparent adhesive layer 5.

10. A circle of the sealant strip is disposed around the edge of the first transparent adhesive layer 4 described in step 1, and another circle of the sealant strip is disposed around the edge of the second transparent adhesive layer 5 described in step 1; the electrochromic film 1 and the electrode 8 are attached to the first transparent adhesive layer 4; the second glass layer 3 with the second transparent adhesive layer 5 are aligned and bonded through the positioning fixture; the bonded device is evacuated at the temperature of 120° C. and bubbles in the area where the sealant is not bonded to the glass and the transparent adhesive layers are evacuated so that the sealing layer 6 is formed, and a good sealing function is also implemented at the electrode 8; and the structural adhesive is dispensed and cured on the edges of the first glass layer 2 and the second glass layer 3 so that the structure layer 7 is formed and the rear-view mirror is obtained.

The sum of the heights of the two circles of the sealant strips is 120% of the thickness of the electrochromic film 1, and the height of each circle of the sealant strip is 60% of the thickness of the electrochromic film 1.

3. The fixing strips 9 are attached to the face of the second glass layer 3 of the rear-view mirror described in step 2 facing away from the electrochromic film 1, and the rear-view mirror is fixed on the platform 10 with the fixing strips 9.

In the rear-view mirror provided in this embodiment, the electrochromic film 1 is well fixed, and the peripheral edges of the first transparent adhesive layer and the second transparent adhesive layer adhere to each other to seal the electrochromic film inside. Thus, when the rear-view mirror vibrates, the displacement between layers of the electrochromic film, for example, the displacement between the electrolyte layer and the electrochromic layer, the displacement between the dielectric layer and the ion storage layer, and the like can be effectively avoided. In the rear-view mirror in this embodiment, the relative vibration and distortion are prevented. Thus, the electrochromic film changes the color stably during use, will not be affected by the mechanical vibration of the automobile, and the artificial external forces, mitigates the influence of the vibration on the rear-view mirror during the traveling of the vehicle, has the good waterproof performance and the excellent ability to block the gases, and prevents the internal device from failing because of the oxidation. The fixing strips better fix the whole rear-view mirror, mitigate the influence of the vibration on the whole mirror, and prevent the relative displacement of the whole mirror.

Embodiment Seven

Referring to FIG. 2, the rear-view mirror provided in this embodiment is the same as the rear-view mirror in embodiment five except for features described below. The rear-view mirror in this embodiment differs from the rear-view mirror in embodiment five in that the first transparent adhesive layer 4 is the SCA and has a thickness of 0.2 mm, and the second transparent adhesive layer 5 is the SCA and has a thickness of 0.2 mm. The sealing layer 6 is made of the epoxy adhesive and has a thickness of 0.5 mm. The structure layer 7 is made of the structural silicone adhesive and has a thickness of 0.5 mm.

In this embodiment, a method for preparing the preceding rear-view mirror is further provided. The method includes steps described below.

11. The first transparent adhesive layer 4 is attached to a cleaned and dried first glass layer 2 through a positioning fixture, and the second transparent adhesive layer 5 is attached to a cleaned and dried second glass layer 3 through the positioning fixture to obtain a first glass layer 1 with the first transparent adhesive layer 4 and a second glass layer 3 with the second transparent adhesive layer 5.

12. The electrochromic film 1, and the first glass layer 2 with the first transparent adhesive layer 4 and the second glass layer 3 with the second transparent adhesive layer 5 described in step 1 are bonded; the bonded device is evacuated at the temperature of 120° C.; the sealant is dispensed and cured at the positions which are around the first glass layer 2 and the second glass layer 3 and adjacent to the first transparent adhesive layer 4, the electrochromic film 1, and the second transparent adhesive layer 5 so that the sealing layer 6 is formed; and the structural adhesive is dispensed and cured on the sealing layer 6 so that the structure layer 7 is formed and the rear-view mirror is obtained.

13. The fixing strips 9 are attached to the face of the second glass layer 3 of the rear-view mirror described in step 2 facing away from the electrochromic film 1, and the rear-view mirror is fixed on the platform 10 with the fixing strips 9.

In the rear-view mirror provided in this embodiment, the electrochromic film 1 is well fixed, and the relative vibration and distortion are prevented. Thus, the electrochromic film changes the color stably during use, will not be affected by the mechanical vibration of the automobile, and the artificial external forces, mitigates the influence of the vibration on the rear-view mirror during the traveling of the vehicle, has the good waterproof performance and the excellent ability to block the gases, and prevents the internal device from failing because of the oxidation. The fixing strips better fix the whole rear-view mirror, mitigate the influence of the vibration on the whole mirror, and prevent the relative displacement of the whole mirror.

Products in embodiments four to seven and a product in the comparative example were tested. The rear-view mirror provided in the comparative example is the same as the rear-view mirror in embodiment four except that the rear-view mirror provided in the comparative example does not have a sealing structure layer (that is, the sealant strip is not attached around the first glass layer during preparation, and operation in step 2 in embodiment four is not performed).

Compared with the rear-view mirror in embodiment four, the electrochromic film of the rear-view mirror provided in this comparative example shows a rapid decrease in performance due to water permeation, affecting the safety in use since there is no sealing structure layer formed by a sealing layer and a structure layer in the comparative example. In addition, the first glass layer and the second glass layer are displaced laterally and longitudinally due to an external force. Considering the strength of an adhesive force, a thin-film device with a weak adhesive force will fall off so that the rear-view mirror will fail.

A waterproof test at 85° C. and 85% RH is performed on the products in embodiments four to seven and the product in the comparative example for 1000 hours to determine whether the products are qualified. A test method and a criterion for determining whether the products are qualified are as follows: a constant temperature and humidity chamber is used to perform the test; a cobalt chloride paper for detecting a water content is used to take the place of the thin-film device; a specimen is stored at 85° C. and 85% relative humidity for 1000 hours; the paper is taken out every 200 hours for observing whether the color of the paper in the specimen is changed; and a product is qualified if the paper is still blue and the product is unqualified if the paper becomes white or purplish-red.

A waterproof test at 52° C. and 98% RH is performed on the products in embodiments four to seven and the product in the comparative example for 1000 hours to determine whether the products are qualified. A test method and a criterion for determining whether the products are qualified are as follows: the constant temperature and humidity chamber is used to perform the test; the cobalt chloride paper for detecting the water content is used to take the place of the thin-film device; a specimen is stored at 52° C. and 98% relative humidity for 1000 hours; the paper is taken out every 200 hours for observing whether the color of the paper in the specimen is changed; and a product is qualified if the paper is still blue and the product is unqualified if the paper becomes white or purplish-red.

A 700 N tensile strength test is performed on the products in embodiments four to seven and the product in the comparative example as the characterization of the shock absorption performance. A test method and a criterion for determining whether the products are qualified are as follows: a tensile machine is used to apply a 700 N load to an outer side of the first glass layer 2 and an outer side of the second glass layer 3 for 10 s; and it is checked whether the glass layers of a specimen are cracked and there is a film falling off, a bubble, or a cracked edge in the specimen, and it is qualified if there is no change. Greater tensile strength of the rear-view mirror indicates that the relative displacement between the multiple layers of the rear-view mirror and even the direct detachment of a layer will not occur under the action of a relatively great external force. When used in automobiles, the rear-view mirrors with the greater tensile strength have better shock absorption performance.

Test results are shown in Table 1 below.

TABLE 1

|  | Results of the Waterproof Test at 85° C. and 85% RH | Results of the Waterproof Test at 52° C. and 98% RH | Results of the 700N Tensile Strength Test |
| --- | --- | --- | --- |
| Embodiment four | Qualified | Qualified | Qualified |
| Embodiment five | Qualified | Qualified | Qualified |
| Embodiment six | Qualified | Qualified | Qualified |
| Embodiment seven | Qualified | Qualified | Qualified |
| Comparative example | Unqualified (the paper becomes purplish-red.) | Unqualified (the paper becomes purplish-red.) | Unqualified (the film falls off and the specimen is divided into two halves.) |

It can be seen from the preceding embodiments and the comparative example that in the rear-view mirror provided in the embodiment of the present application, the first transparent adhesive layer, the second transparent adhesive layer, and the sealing structure layer cooperate with each other, thereby preventing the relative vibration and distortion, producing a good shock adsorption effect for the electrochromic film, and having the water-proof performance. In addition, the fixing strips can better fix the whole rear-view mirror so that the influence of the vibration on the whole mirror can be mitigated, and the relative displacement of the whole mirror can be prevented. In the comparative example, the specimen has no sealing structure layer and therefore has a poor shock absorption effect and does not have the waterproof performance.

What is claimed is:

1. A rear-view mirror, comprising an electrochromic film, a first glass layer, a second glass layer, a first transparent adhesive layer, a second transparent adhesive layer and a sealing structure layer,
   wherein the first glass layer and the second glass layer are located on two faces of the electrochromic film respectively, and each of the first glass layer and the second glass layer has a peripheral side face extending along a direction where the first glass layer and the second glass layer are sequentially arranged;
   the first transparent adhesive layer is located between the first glass layer and the electrochromic film,
   the second transparent adhesive layer is located between the second glass layer and the electrochromic film,
   the sealing structure layer is located on edges of the first glass layer and the second glass layer, the sealing structure layer, the first glass layer and the second glass layer form a sealing structure, and the electrochromic film is sealed in the sealing structure;
   the sealing structure layer comprises a sealing layer and a structure layer, the sealing layer and the structure layer are disposed adjacent to each other, and the sealing layer is disposed closer to the electrochromic film than the structure layer; wherein the structure layer surrounds the sealing layer;
   the sealing layer is located between the first glass layer and the second glass layer;
   the structure layer comprises an internal portion located between the first glass layer and the second glass layer, and an external portion not located between the first glass layer and the second glass layer; wherein the external portion surrounds the internal portion;

wherein the external portion partially covers the peripheral side face of each of the first glass layer and the second glass layer.

2. The rear-view mirror according to claim 1, wherein a material of the sealing layer comprises at least one of silicone adhesive, butyl rubber, or epoxy adhesive.

3. The rear-view mirror according to claim 1, wherein a material of the structure layer comprises at least one of structural silicone adhesive or structural epoxy adhesive.

4. The rear-view mirror according to claim 1, wherein the sealing layer is located on peripheral side faces of the first transparent adhesive layer, the electrochromic film, and the second transparent adhesive layer.

5. The rear-view mirror according to claim 1, wherein the sealing layer is located between an edge of the first transparent adhesive layer and an edge of the second transparent adhesive layer, and is located on a peripheral side face of the electrochromic film.

6. The rear-view mirror according to claim 1, wherein an edge of the first transparent adhesive layer and an edge of the second transparent adhesive layer adhere to each other to form a sealing structure, the electrochromic film is disposed in the sealing structure formed by the first transparent adhesive layer and the second transparent adhesive layer, and the sealing layer is located on peripheral side faces of the first transparent adhesive layer and the second transparent adhesive layer.

7. The rear-view mirror according to claim 1, wherein a thickness of the structure layer is not less than a thickness of the sealing layer and not greater than a sum of a thickness of the first glass layer, a thickness of the first transparent adhesive layer, a thickness of the electrochromic film, a thickness of the second transparent adhesive layer, and a thickness of the second glass layer.

8. The rear-view mirror according to claim 1, wherein a material of the first transparent adhesive layer comprises at least one of optically clear adhesive (OCA), solid optically clear adhesive (SCA), ethylene-vinyl acetate (EVA) copolymer, or polyvinyl butyral (PVB); and a material of the second transparent adhesive layer comprises at least one of OCA, SCA, ethylene-vinyl acetate copolymer, or polyvinyl butyral.

9. The rear-view mirror according to claim 1, wherein a face of the second glass layer facing the second transparent adhesive layer is coated with a reflective layer.

10. The rear-view mirror according to claim 1, further comprising an electrode connected to the electrochromic film and led out from the sealing structure layer.

11. The rear-view mirror according to claim 1, further comprising fixing strips located on a face of the second glass layer facing away from the electrochromic film, wherein the fixing strips are configured to fix the rear-view mirror on a platform, and a number of the fixing strips is not less than one.

12. The rear-view mirror according to claim 1, wherein the sealing layer is arranged along a peripheral direction of each of the first transparent adhesive layer, the electrochromic film, and the second transparent adhesive layer; the sealing layer, the first transparent adhesive layer, and the second transparent adhesive layer form a sealed adhesive frame; the electrochromic film is located in the sealed adhesive frame.

* * * * *